United States Patent
Beate et al.

(10) Patent No.: US 7,467,868 B2
(45) Date of Patent: Dec. 23, 2008

(54) HEAD MAGNIFIER

(75) Inventors: Bastian Beate, Munich (DE); Guido Hattendorf, Aalen (DE); Roland Hertle, Megesheim (DE); Reinhold Pfeifer, Megesheim (DE)

(73) Assignee: Carl Zeiss Surgical GmbH, Oberkochen (DE)

( * ) Notice: Subject to any disclaimer, the term of this patent is extended or adjusted under 35 U.S.C. 154(b) by 231 days.

(21) Appl. No.: 11/560,000

(22) Filed: Nov. 15, 2006

(65) Prior Publication Data

US 2007/0139796 A1 Jun. 21, 2007

(30) Foreign Application Priority Data

Nov. 15, 2005 (DE) .................. 10 2005 054 444

(51) Int. Cl.
*G02C 1/00* (2006.01)
*G02B 23/00* (2006.01)

(52) U.S. Cl. ...................... 351/158; 359/409

(58) Field of Classification Search .............. 351/41, 351/158; 359/409–418
See application file for complete search history.

(56) References Cited

U.S. PATENT DOCUMENTS

| 4,198,114 A | 4/1980 | Zapp |
| 4,810,081 A | 3/1989 | Mapelli et al. |
| 4,886,340 A | 12/1989 | Kanda |
| 5,381,263 A | 1/1995 | Nowak et al. |
| 5,535,053 A | 7/1996 | Baril et al. |
| 5,920,371 A * | 7/1999 | Chang et al. ............. 351/158 |
| 5,923,467 A | 7/1999 | Pericic et al. |
| 6,064,520 A | 5/2000 | Nowak et al. |
| 6,472,776 B1 * | 10/2002 | Soto et al. ................. 307/400 |
| 6,667,832 B2 | 12/2003 | Caplan et al. |
| 6,704,141 B1 | 3/2004 | Nowak et al. |
| 2002/0071176 A1 | 6/2002 | Buettgenbach |
| 2005/0111097 A1 | 5/2005 | Iannarelli et al. |

FOREIGN PATENT DOCUMENTS

| EP | 0 300 384 A2 | 1/1989 |
| WO | WO03019267 A1 | 3/2003 |
| WO | WO2004083941 A1 | 9/2004 |

* cited by examiner

*Primary Examiner*—Huy K Mai
(74) *Attorney, Agent, or Firm*—Patterson, Thuente, Skaar & Christensen, P.A.

(57) ABSTRACT

A head magnifier is provided, comprising magnifying optics as well as a coupling mechanism for attaching the magnifying optics to a head mount which can be placed on a user's head. The coupling mechanism has a swivel mechanism enabling swiveling of the magnifying optics relative to the head mount about a swivel axis, and an adjusting mechanism enabling adjustment of the distance between the magnifying optics and either the swivel axis or the head mount by moving the magnifying optics along a longitudinal axis. The swivel mechanism provides a swivel angle range for the magnifying optics and enables setting and fixing of different swivel angles of the magnifying optics, said angles falling within the swivel angle range. The swivel axis extends in front of the user's head in the mounted condition of the head magnifier, and the adjusting mechanism telescopes with the magnifying optics mounted to the mechanism's front end.

20 Claims, 2 Drawing Sheets

HEAD MAGNIFIER

RELATED APPLICATION

The current application claims the benefit of priority to German Patent Application No. 10 2005 054 444.4 filed on Nov. 15, 2005. Said application is incorporated by reference herein.

FIELD OF THE INVENTION

The present invention relates to a head magnifier comprising magnifying optics as well as a coupling mechanism for fixing the magnifying optics to a head mount which can be placed on the user's head. More particularly, the invention relates to such wherein the coupling mechanism comprises a swivel mechanism enabling swiveling of the magnifying optics relative to the head mount about a swivel axis, and an adjusting mechanism enabling adjustment of the distance between the magnifying optics and either the swivel axis or the head mount by moving the magnifying optics along a longitudinal axis, wherein the swivel mechanism provides a swivel angle range for the magnifying optics and enables setting and fixing of different swivel angles of the magnifying optics, said angles falling within the swivel angle range, and wherein the swivel axis extends in front of the user's head in the mounted condition of the head magnifier.

BACKGROUND OF THE INVENTION

Such a head magnifier is known, for example, from U.S. Pat. No. 6,667,832 B2, wherein the adjusting mechanism comprises a rod on which a carrier with the magnifying optics fixed to it can be moved in a longitudinal direction. This has the disadvantageous effect that the rod protrudes forwardly with respect to the carrier in case of a minimal distance between the user's eyes and the magnifying optics. The length of this protruding portion of the rod corresponds substantially to the maximum distance between the magnifying optics and the user's eyes. Thus, a predetermined range of adjustment for the distance between the magnifying optics and the user's eyes always causes the rod to protrude forwardly with respect to the magnifying optics in an undesirable manner in those cases where the maximum distance between the magnifying optics and the user's eyes is not set.

In a head magnifier described in DE 28 02 940 C2 the swivel axis disadvantageously extends approximately in the middle between the front and the back of the head in the mounted condition of the head magnifier. Since the magnifying optics are arranged in front of the user's eyes, the swivel leverage and, thus, the torque caused by the magnifying optics is high. On the one hand, this is uncomfortable when wearing the head magnifier; on the other hand, a great mechanical effort is required in order to achieve precise swiveling and, thus, precise adjustment of the head magnifier to the user's corresponding viewing angle.

SUMMARY OF THE INVENTION

In view thereof, it is an object of the invention to provide a head magnifier which overcomes the above-described disadvantages almost completely.

According to the invention, the object is achieved by a head magnifier as described above in that the adjusting mechanism comprises a telescopic rod having the magnifying optics attached to a front end of said telescopic rod. By providing the telescopic rod, the portion protruding from the magnifying optics is minimized and can be defined regardless of the provided range of adjustment for the distance between the magnifying optics and the user's eyes. Thus, the protruding part is independent from the set distance between the magnifying optics and the user's eyes. This is advantageous, in particular, in case of small distances as compared to the head magnifier of U.S. Pat. No. 6,667,832 B2.

The telescopic rod or telescopic element comprises, in particular, a plurality of thin-walled tubes guided in a manner displaceable within each other, the tube cross-section preferably being greater in width than in height. In particular, the telescopic rod comprises two, three or more tubes.

In particular, the telescopic rod may be provided such that the outer tube is fixed by clamping or by frictional engagement, respectively, in any position of the inner tube within the outer tube. The forces are preferably selected such that the position of the individual tubes of the telescopic rod is fixed during normal use. The user can modify the distance by pulling or pushing the front end of the telescopic rod.

In particular, the magnifying optics may be hinge connected to the front end of the telescopic rod. Said hinge connection may be the swivel axis of the head magnifier or a further swivel axis. Both swivel axes are preferably parallel.

The telescopic rod is provided such that the modification of its length is effected along the longitudinal axis.

Since the swivel axis extends in front of the user's head, the swivel arm is considerably smaller in comparison with the case where the swivel axis extends in the region between the front and the back of the head. This leads to a reduced torque, resulting in improved wearing comfort, on the one hand, and reducing the mechanical effort required for precise adjustment of a swivel angle, on the other hand. With the swivel arm being shorter while the swivel range is the same as compared with DE 28 02 940 C2, the swivel angle range is additionally increased.

Since the head magnifier further also comprises the adjusting mechanism, the swivel angle of the magnifying optics can be optimally selected for each viewing direction, and at the same time, the distance between the magnifying optics and the user's eyes can be minimized or kept constant, for example, thus allowing to avoid undesired restrictions of the field of vision which occur if the distance between the eye and the magnifying optics is too great (keyhole effect).

The mounted condition of the head magnifier is that condition in which the magnifying optics are mounted to the head mount via the coupling mechanism, and the head mount is placed on the user's head.

The longitudinal axis preferably extends in a straight line so that the adjusting mechanism enables a rectilinear movement of the magnifying optics. However, the longitudinal axis may also be curved, so that the adjusting mechanism defines a movement of the magnifying optics along a curved path line. In any case, the movement of the magnifying optics along the longitudinal axis causes a modification of the distance between the magnifying optics and either the swivel axis or the head mount. The adjusting mechanism cannot realize a pure rotary movement or swivel movement, but always imposes a longitudinal movement.

The swivel mechanism of the head magnifier may further enable swiveling of the magnifying optics about a further swivel axis, with the adjusting mechanism enabling adjustment of the distance between both swivel axes by moving the magnifying optics along the longitudinal axis. This yields a further degree of freedom for optimal adjustment in the magnifying optics for each viewing angle. In particular, the further swivel axis may also be used to swivel the head magnifier out of the user's field of vision so that the user, although wearing the head magnifier, can also view the object to be viewed, if he wishes, without the head magnifier.

In the mounted condition of the head magnifier, the further swivel axis extends particularly in front of the user's head. This allows the distance from the magnifying optics to the further swivel axis to be minimized, thus leading to a reduction in torque. The reduction in torque leads to increased wearing comfort for the user, because the pressure on the user's nose, for example, is lower if the head mount comprises a nose support.

In particular, the adjusting mechanism is provided such that it enables continuous distance adjustment. Thus, the desired setting can be achieved with utmost precision. The continuous adjustability is realized, in particular, by frictional engagement or forces of friction, respectively.

The magnifying optics particularly comprise two oculars, each of said oculars being assigned to one of the user's eyes. In particular, this also makes a stereo head magnifier possible.

Both oculars may be fixed to an ocular support which can be swiveled about the swivel axis (axes). This ensures that both oculars are always swiveled about the same angle.

The adjusting mechanism may comprise a telescopic rod. In particular, a (front) end of the telescopic rod may be connected to the ocular support in the middle between both oculars. Thus, an extremely small and compact head magnifier is provided, in which the distance can be set as desired.

The front end of the telescopic rod may comprise an ergonomically designed gripping region (in particular for the thumb and the index finger).

In particular, the coupling mechanism may be releasably connectable to the head mount. Further, the head mount may also be part of the head magnifier. For example, the head mount may be a pair of spectacles or may be designed in the manner of spectacles. However, all other types of head mounts are also possible, in particular helmet-like mounts or other mountable or clampable mounts.

The swivel mechanism may be provided such that the swivel angles are continuously adjustable within the swivel angle range. This purpose may be served, for example, by frictional engagement.

BRIEF DESCRIPTION OF THE DRAWINGS

The invention will be explained in more detail below, by way of example and with reference to the drawings, wherein.

DETAILED DESCRIPTION

Figure 1:
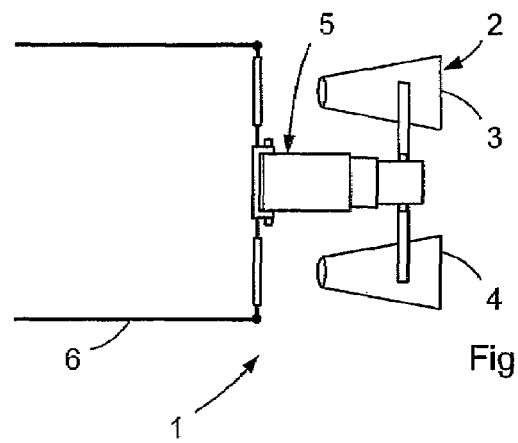
FIG. 1 shows a schematic top view of a head magnifier according to one embodiment.

In the embodiment shown in FIG. 1, the head magnifier 1 comprises magnifying optics 2 with two oculars 3, 4, as well as a coupling mechanism 5, to which the magnifying optics 2 are attached and which serves to connect the magnifying optics 2 to a head mount 6 which can be placed on a user's head. In this case, the head mount 6 is provided as spectacles.

Figure 2:
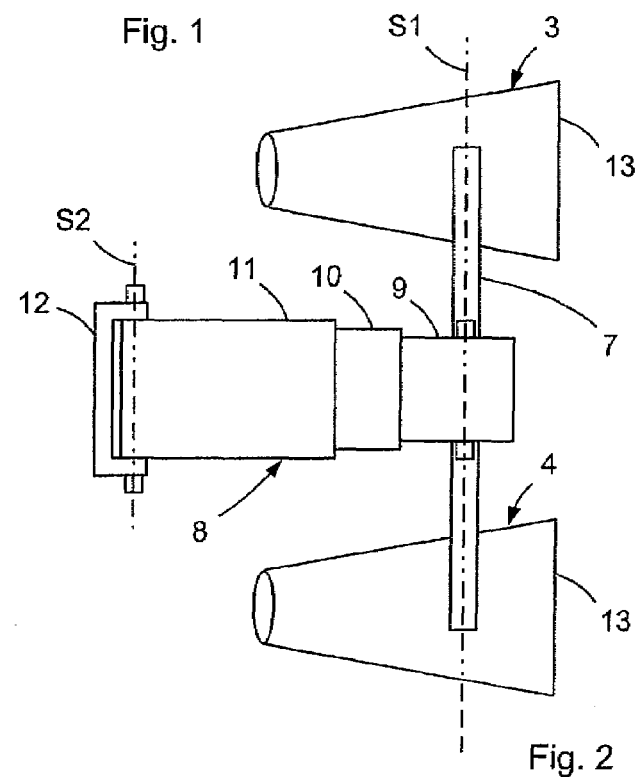
FIG. 2 shows an enlarged top view of the coupling mechanism and magnifying optics of the head magnifier of FIG. 1.

As is evident, for example, from FIG. 2, the coupling mechanism 5 comprises an ocular support 7 to which both oculars 3, 4 are attached. The distance between both oculars 3, 4 is preferably selected according to the user's interpupillary distance. In particular, the ocular support 7 may be provided such (not shown) that the distance between both oculars 3 and 4 is adjustable.

The ocular support 7 is hinge connected in a swivelable manner to the foremost element 9 of a telescopic rod 8 such that the ocular support 7 and, thus, the oculars 3 and 4 can be swiveled about a swiveling axis S1. The swivelable hinge connection is designed such that a swivel angle range of, for example, 50° is possible. Swivel angles falling within said swivel angle range are continuously adjustable and fixable. This is achieved here by frictional engagement between the ocular support 7 and the front element 9, so that the set swivel angle is maintained. Said angle can only be shifted by increased application of force.

In addition to the front element 9, the telescopic rod 8 also comprises two further elements 10, 11 here, the rear element 11 having its rear end hinge connected to an adapter 12 in a swiveling manner, said adapter serving to connect the coupling mechanism 5 to the head mount 6. The swiveling hinge connection of the rear element 11 to the adapter 12 enables swiveling of the telescopic rod 8 about a second swivel axis S2. There is frictional engagement here, too, between the rear element 11 and the adapter 12 so that the desired swivel position is easily adjustable.

The two swivel axes S1 and S2 as well as the possibility of adjusting the distance between the two swivel axes S1 and S2 by means of the telescopic rod 8 allow the oculars 3 and 4 to be positioned in the optimal swivel position for all viewing angles of the user and, at the same time, as close as possible to the user's eyes or to the spectacle lenses, respectively. Thus, the disadvantageous keyhole effect resulting from too great a distance between the eye and the ocular can be avoided.

Figure 3:
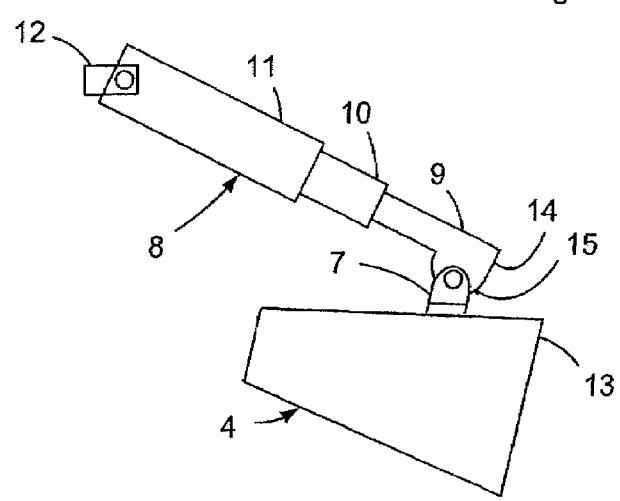
FIG. 3 shows an enlarged lateral view of the coupling mechanism and magnifying optics of FIG. 2.

In the embodiment shown in FIGS. 1 to 3, the telescopic rod 8 is downwardly inclined at approximately 30° (relative to a horizontal line (not shown) in FIG. 3), and the oculars 3, 4 are downwardly inclined at approximately 15° relative to the horizontal line.

The oculars 3, 4 are designed here for a working distance (i.e. the distance between the ocular's front end 13 and an object to be viewed) of approximately 20 to 60 cm and, in particular, for a working distance of 30 to 50 cm. Adapting the ocular position to the viewing direction is preferably effected by swiveling about the first swivel axis S1. The second swivel axis S2 preferably serves to fold the head magnifier upwards so that the user, while wearing the head magnifier, can also view the object without the head magnifier.

Figure 4:
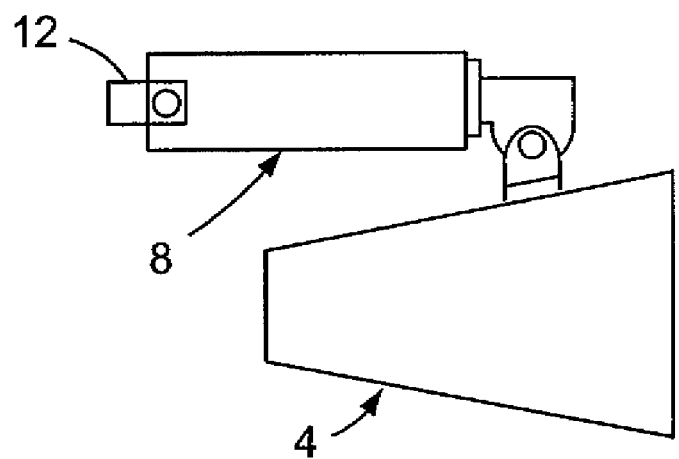
FIG. 4 shows a lateral view with the telescopic rod retracted.

FIG. 4 shows the telescopic rod 8 fully retracted such that the distance between both swivel axes S1 and S2 is minimized. Further, the swivel angles with respect to both axes S1 and S2 are approximately 0°. This is the preferred setting, for example, when the user looks straight ahead.

Figure 5:
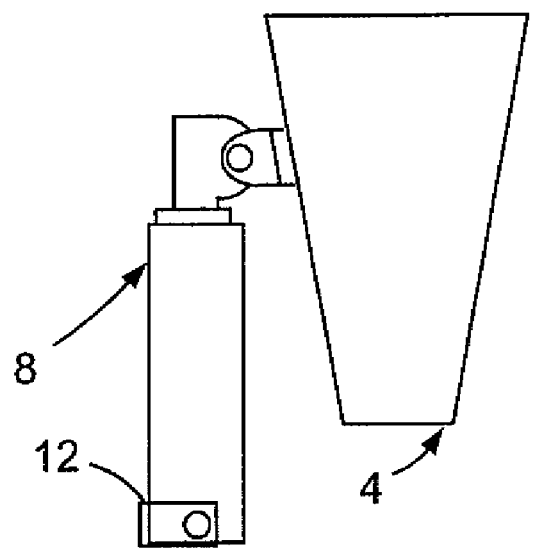
FIG. 5 is a lateral view showing the upwardly folded condition of the head magnifier.

FIG. 5 shows the head magnifier 1 folded upwards by 90° about the second swivel axis S2. In this case, the user can view the object to be viewed without the head magnifier 1.

The front end 14 of the front element of the telescopic rod 8 may be ergonomically shaped to form a gripping area. Thus, the user can take the front end 14, for example, between his thumb and index finger and set the desired orientation and position of the oculars by pulling or pushing, respectively, and by swiveling.

Further, it is possible to provide a slot in the bottom surface of the second and, optionally, third element 10, 11 of the telescopic rod 8, into which slot the extension 15 of the front element 9, to which the ocular support 7 is hinge connected, can retract, so that the total length of the telescopic rod, when pushed together, is still smaller as compared to the illustration in FIG. 4.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

What is claimed is:

1. A head magnifier comprising magnifying optics and a coupling mechanism for attaching the magnifying optics to a head mount which can be placed on a user's head;
   wherein the coupling mechanism comprises a swivel mechanism enabling swiveling of the magnifying optics relative to the head mount about a swivel axis, and an adjusting mechanism enabling adjustment of the distance between the magnifying optics and one of the swivel axis and the head mount by moving the magnifying optics along a longitudinal axis,
   wherein the swivel mechanism provides a swivel angle range for the magnifying optics and enables setting and fixing of different swivel angles of the magnifying optics, said angles falling within the swivel angle range,
   wherein the swivel axis extends in front of the user's head in the mounted condition of the head magnifier,
   wherein the adjusting mechanism comprises a telescopic rod, with the magnifying optics being mounted to a front end of the telescopic rod, and
   wherein the swivel mechanism enables swiveling of the magnifying optics about a further swivel axis and the adjusting mechanism enables adjustment of the distance between both swivel axes by moving the magnifying optics along the longitudinal axis.

2. The head magnifier as claimed in claim 1, wherein the further swivel axis extends in front of the user's head in the mounted condition of the head magnifier.

3. The head magnifier as claimed in claim 1, wherein the telescopic rod enables continuous distance adjustment.

4. The head magnifier as claimed in claim 1, wherein the magnifying optics comprise two oculars, each of said oculars being assigned to one of the user's eyes.

5. The head magnifier as claimed in claim 4, wherein the two oculars are attached to an ocular support which can be swiveled about the swivel axis (axes).

6. The head magnifier as claimed in claim 5, wherein the front end of the telescopic rod is connected to the ocular support in the middle between both oculars.

7. The head magnifier as claimed in claim 1, wherein the magnifying optics are hingedly connected in a swivelable manner to the front end of the telescopic rod.

8. The head magnifier as claimed in claim 1, wherein the front end of the telescopic rod comprises an ergonomically shaped gripping region.

9. The head magnifier as claimed in claim 1, wherein the coupling mechanism is releasably connectable to the head mount.

10. The head magnifier as claimed in claim 1, wherein the head mount is part of the head magnifier.

11. The head magnifier as claimed in claim 1, wherein the swivel angles are continuously adjustable within the swivel angle range.

12. A head magnifier comprising magnifying optics and a coupling mechanism for attaching the magnifying optics to a head mount which can be placed on a user's head,
    wherein the coupling mechanism comprises a swivel mechanism enabling swiveling of the magnifying optics relative to the head mount about a swivel axis, and an adjusting mechanism enabling adjustment of the distance between the magnifying optics and either the swivel axis or the head mount by moving the magnifying optics along a longitudinal axis,
    wherein the swivel mechanism provides a swivel angle range for the magnifying optics and enables setting and fixing of different swivel angles of the magnifying optics, said angles falling within the swivel angle range,
    wherein the swivel axis extends in front of the user's head in the mounted condition of the head magnifier,
    wherein the adjusting mechanism comprises a telescopic rod, with the magnifying optics being mounted to a front end of the telescopic rod, and wherein the magnifying optics are hingedly connected in a swivelable manner to the front end of the telescopic rod.

13. The head magnifier as claimed in claim 12, wherein the swivel mechanism enables swiveling of the magnifying optics about a further swivel axis and the adjusting mechanism enables adjustment of the distance between both swivel axes by moving the magnifying optics along the longitudinal axis.

14. The head magnifier as claimed in claim 13, wherein the further swivel axis extends in front of the user's head in the mounted condition of the head magnifier.

15. The head magnifier as claimed in claim 12, wherein the front end of the telescopic rod comprises an ergonomically shaped gripping region.

16. A head magnifier comprising magnifying optics and a coupling mechanism for attaching the magnifying optics to a head mount which can be placed on a user's head,
    wherein the coupling mechanism comprises a swivel mechanism enabling swiveling of the magnifying optics relative to the head mount about a swivel axis, and an adjusting mechanism enabling adjustment of the distance between the magnifying optics and either the swivel axis or the head mount by moving the magnifying optics along a longitudinal axis,
    wherein the swivel mechanism provides a swivel angle range for the magnifying optics and enables setting and fixing of different swivel angles of the magnifying optics, said angles falling within the swivel angle range,
    wherein the swivel axis extends in front of the user's head in the mounted condition of the head magnifier,
    wherein the adjusting mechanism comprises a telescopic rod, with the magnifying optics being mounted to a front end of the telescopic rod, and
    wherein the front end of the telescopic rod comprises an ergonomically shaped gripping region.

17. The head magnifier as claimed in claim 16, wherein the swivel mechanism enables swiveling of the magnifying optics about a further swivel axis and the adjusting mechanism enables adjustment of the distance between both swivel axes by moving the magnifying optics along the longitudinal axis.

18. The head magnifier as claimed in claim 17, wherein the further swivel axis extends in front of the user's head in the mounted condition of the head magnifier.

19. The head magnifier as claimed in claim 16, wherein the telescopic rod enables continuous distance adjustment.

20. The head magnifier as claimed in claim 16, wherein the magnifying optics are hingedly connected in a swivelable manner to the front end of the telescopic rod.

* * * * *